INVENTOR.
RALPH H. ROSENBERG
BY John P. Tarbox
ATTORNEY.

Patented Jan. 9, 1934

1,943,089

UNITED STATES PATENT OFFICE 1,943,089

BRAKE DRUM SWAGING MACHINE

Ralph H. Rosenberg, Detroit, Mich., assignor to Budd Wheel Company, Philadelphia, Pa., a corporation of Pennsylvania Application July 12, 1930. Serial No. 467,500

33 Claims. (Cl. 153—48)

My invention relates to metal working machines and more particularly to a machine for internally swaging annular metal work pieces, such as brake drums.

It is a main object of my invention to provide a machine by the use of which such work pieces can be formed internally with very true surfaces of revolution, and to very accurate dimension and in the use of which this may be accomplished at a rate required in mass production, and at very low cost.

To this end, I have provided a machine in which the work is clamped peripherally to confine it, by suitable chucking means and while so clamped, hammering means are provided to operate upon the interior periphery of the work, and at the same time means are provided for slowly relatively rotating the clamping and hammering means, whereby it is possible to treat the entire inner peripheral surface of the work in a very short space of time.

In the further carrying out of my invention, the hammers are operated at very high speed by a rotary actuator adapted to successively and repeatedly engage the inner ends of the hammers and throw them outwardly into engagement with the inner surface of the work, the resiliency of the hammers and the work being depended on to return the hammers to their inner positions. The work is mounted in a chuck adapted to have relative approach and separation movement to permit ready insertion and removal of the work in the machine and operation thereon by the hammering means.

As a further carrying out of the inventive idea, the machine is made wholly automatic, the operation of the chuck for clamping and releasing the work, the approach and separation of the hammering means and the chuck, the starting and stopping of the rotation of the chuck, and the stopping of the machine with the chuck and hammering means in their separated position are all initiated by the operator and then follow in suitably timed relation until a work piece is finished.

The features whereby these objects are attained and the advantages inherent and further minor objects and advantages will become apparent from the following detailed description when read in connection with the accompanied drawings in which.

In the embodiment of the invention, shown on the accompanying drawings, the swaging head is generally designated 10, the work clamping chuck, 11, the chuck carrier, 12, the machine frame 13, the motor for driving the swaging actuator 13', the motor for rotating the chuck, 14, and the motor for approaching and separating the swaging head and work clamping chuck.

The machine frame 13 may comprise a hollow rectangular casting provided with suitable reinforcing ribs and brackets and is supported at a convenient height from the floor by the four legs 16 arranged at the four corners of the frame.

Figure 1:
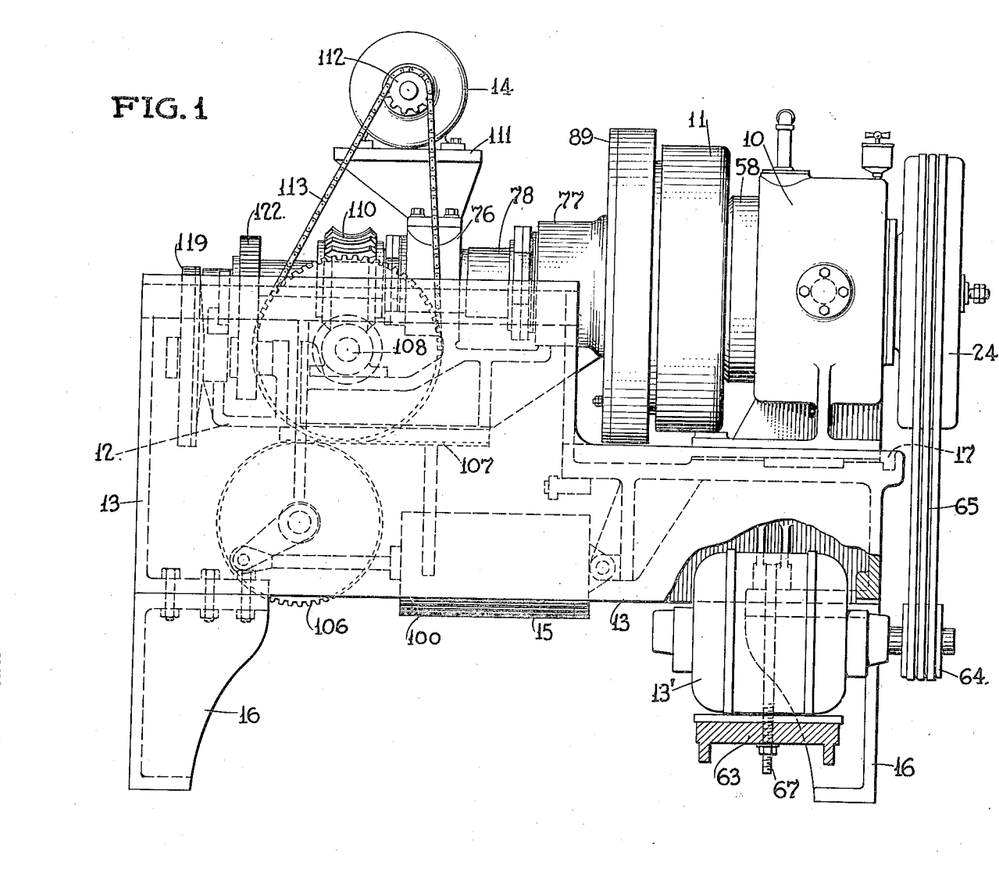
Figs. 1, 2, and 3 are, respectively, side elevational, end elevational and plan views of a machine embodying my invention.

At one end of the frame, the right hand end in Fig. 1, the top of the frame is formed into a tray 17, and bosses or ribs 18 rising from the bottom of the tray and accurately machined in their upper surfaces form seats for the swaging head 10, the laterally flanged base 18' of which is bolted down onto the main frame through its lateral flanges and the ribs 18. The swaging head and frame 13 are keyed together to longitudinally align them and maintain them in alignment by a key 19 fitting corresponding keyways formed in the central rib 18 and the base of the swaging head.

In its upper portion the swaging head is provided with a large diameter bearing 20 providing a generous bearing surface for the swaging hammer actuator shaft 21 extending longitudinally through the head. The shaft is radially supported by a suitable bearing bushing and roller bearings 22 are provided adjacent the outer end of the shaft, where there is supported on the reduced end 23 projecting beyond the bearing 20, the heavy combined flywheel and pulley 24. The end thrust of the shaft is taken by thrust bearings 25 and 26 arranged, respectively, between an annular plate 27 bolted to the end face of the head and the flywheel and between said plate and the shoulder formed by the reduced end of the shaft. The flywheel is splined to the shaft and held in place by a spanner actuable clamping nut clamping it against a shoulder on the reduced end of the shaft.

The shaft is provided axially with a stepped bore, the steps dividing the bore into four sections of decreasing diameter from its inner to its outer end. In this bore is mounted the hammer actuating mechanism and means for adjusting the same.

The swaging hammers themselves may comprise very hard steel alloy blocks 28 arranged in circumferentially spaced relation at the inner end of the swaging head. They are guided in radial slots 29, (see Fig. 7) and have lateral ribs, 30, (see Fig. 10), which slide in corresponding grooves at the sides of the slots. The inner walls of the grooves are formed by removable blocks 31, bolted in place by screw bolts 32 for manufacturing convenience, and to permit replacement of a hammer or hammers, if desired, without taking down the head. The outer working faces 33 of the hammers are curved in a transverse plane, the arc of curvature varying with the hardness of the metal being worked, or the smoothness of the surface required. The working faces of the hammers are elongated to correspond with the width of the surface to be worked and the contour of the faces longitudinally corresponds to the contour of the surface of revolution which it is desired to work. In the embodiment of the invention illustrated, the working face extends parallel to the axis of the shaft, and is thus designed to work a cylindrical surface. At their inner faces the hammers are generally of a transverse curvature, to clear the actuating means except in their central portion, where they are provided each with a longitudinal relatively narrow rib 34 of curved contour in cross section which rib alone receives the impact of the actuating means and is so shaped as to reduce the time period of the actuating means.

Figure 7:
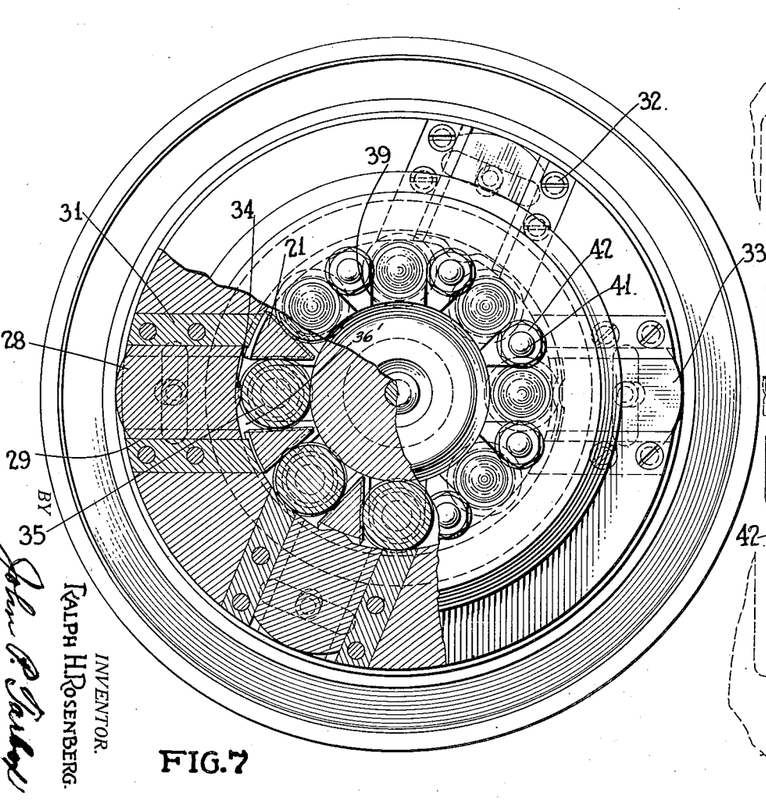
Figs. 7 and 8 are detail partial sectional views taken, respectively, on a transverse plane through the swaging head and on a longitudinal plane through the axis of the swaging head.
Figure 8:
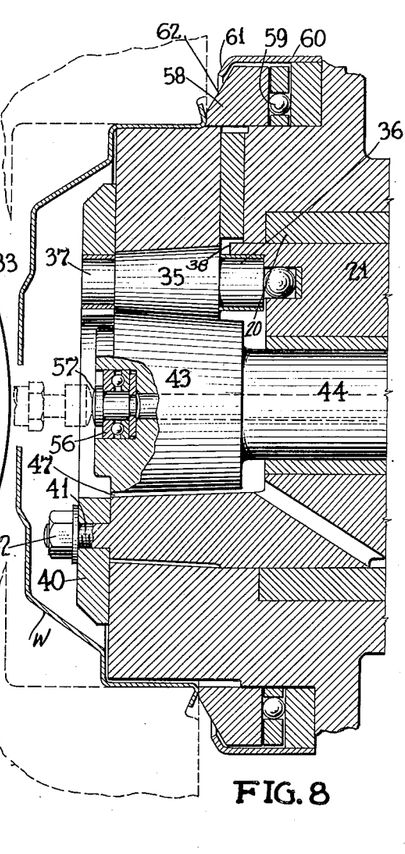

In the present embodiment of my invention, I have shown four hammers in the swaging head, arranged in pairs diametrically opposite each other, so as to distribute the forces in balanced relation on opposite sides of the axis of the machine and work. The diameters on which the pairs of hammers are arranged, as shown in Fig. 7, are not arranged at right angles to each other, but at an angle of approximately 67½°. This angular arrangement of the opposed pairs of hammers is desirable in the machine shown for the smooth operation of the machine as will appear from the following description of the actuating mechanism. There are, however, other angles at which these hammers will produce smooth operation depending upon the machine design.

The actuating mechanism, in the present case, comprises eight rollers 35 equally spaced about the axis of the machine, and confined in radial slots 36' in the inner end of the actuator shaft 21. The rollers have frusto-conical surfaces which are adapted, in the revolution of the shaft, to successively engage the curved ribs 35 of the hammers and thus deliver the swaging blows upon the work. The rolling engagement of the actuating rollers with the hammers deliver the impacts with a minimum of friction between the rollers and hammers. Since there are eight equally spaced rollers and only four hammers arranged as described, it will be seen that only two of the hammers are actuated in their working stroke at the same instant, for while a pair of opposed hammers is being actuated, the other pair is located in the space between adjacent actuating rollers see Fig. 7.

From each end of the conical surfaced actuating portions of the rollers project trunnions 36 and 37, the trunnions being surrounded by suitable bearing bushings guided for radial movement, the outer ones in slots 38 in the actuator shaft, and the inner ones, in corresponding slots 39 in a plate 40 bolted to the inner face of the shaft through the stub bolts 41 and nuts 42. Thus it will be seen that the rollers are constrained against bodily movement in all directions except radially, the radial movement being for the purpose of feeding them toward the work.

This radial movement is effected through an actuator having a frusto-conical head portion 43 located in opposed relation to the inner faces of the rollers and adapted to actuate all of them simultaneously. The actuator is located centrally and guided for axial movement by a cylindrical stem 44 in the bearing bushing 45 seated in the second of the stepped portions of the bore extending axially through the shaft, the head of the actuator occupying the first, or largest diameter section 47 of the bore, the wall of which is frusto-conical to correspond with the shape of the head, but spaced from the periphery of the head to permit free longitudinal movement thereof within working limits.

Figure 5:
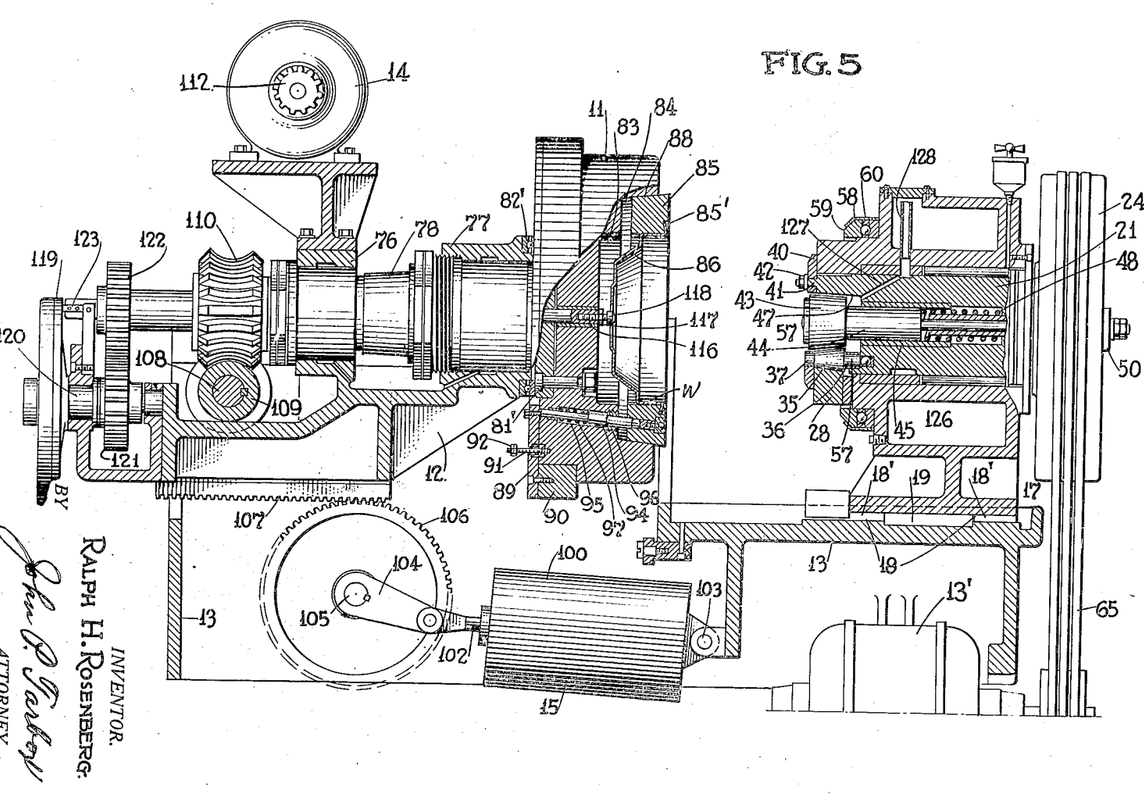
Fig. 5 is a partial central vertical longitudinal sectional view of the machine showing the swaging head, and work clamping chuck in their separate positions.

Normally, as shown in Fig. 5, the actuator head 43 is forced inwardly by a compression spring 48 bearing at one end against the shoulder formed by the outer end of the third section of the base in the shaft, and, at its other end against the end of the stem 44 of the actuator.

In the outer reduced end of the bore of the actuator shaft 21 is threaded a stop sleeve 49, which limits the outward or feeding movement of the actuator head 43 and its attached guiding stem 44, and by reason of this screw threaded connection of the sleeve with the shaft, its position can be readily adjusted, to adjust the permissible feeding movement of the actuator for any given piece of work. It is locked in adjusted position by the lock nut 50 and washer 51 clamped against nut 28.

Inward movement of the actuator head and attached stem under the action of the spring 48 is limited by a rod 52 extending through the sleeve 49 and screw-threaded at its outer end which projects beyond the outer end of the sleeve, the screw-threaded end receiving a stop nut 53 and a lock nut 54. The rod 52 at its inner end extends into a bore in the actuator stem 44 and is locked thereto by a set screw, as clearly shown in Fig. 6. Thrust bearings 55 and 56 are provided, respectively, at the outer and inner ends of the actuator. The former takes the thrust of the actuator against the end of the stop sleeve 49 and the latter takes the thrust of the hardened button 57 seated in an axial recess in the inner end of the actuator head, when it is engaged by means to be presently described for moving the actuator outwardly against the pressure of the spring 48.

A work positioning and clamping ring 58 is mounted on the inner end of the head radially outwardly of the path of the hammer, the ring being loosely received to permit rotation thereof with the work and work holding chuck, and is backed by a thrust bearing 59 and held in place by a sleeve 60 covering the thrust bearing and having its inner edge turned inwardly at 61 to overlap the outer inclined face 62 of the ring.

The actuator shaft 21 is continuously driven when the machine is in operation by the electric motor 13' supported on the platform 63 suspended under the frame 13 of the machine through the grooved pulley 64 on its armature shaft, and the multiple belts 65 connecting the grooves in the pulley 64 with the corresponding grooves in the periphery of the flywheel. This direct drive from the armature shaft, with a speed reduction only in the ratio of the circumferences of the two pulleys imparts to the actuator shaft a high rate of rotation such as 400 R. P. M., and, since it is possible for each hammer to be actuated eight times for each rotation of the shaft, the working strokes are delivered with great rapidity, so much so that it is ordinarily sufficient to reduce the inner periphery of the work to a true surface of revolution and to accurate size in less than one complete revolution of the work piece. The hammer blows are delivered with such rapidity that, notwithstanding the fact that each blow works only a small area of the surface, the blows overlap to such an extent, that the surface is reduced to a true surface of revolution for all practical purposes, accuracy in dimension to .001 of an inch on a diameter being obtainable.

To insure a positive drive of the actuator, provision must be made for the tensioning of the belts 65, and this is done by adjustably suspending the motor platform 63. To this end, the platform is hingedly suspended at one end from brackets 66 bolted to the frame 13 and from the other end by a link or links 67 hinged to the frame and adjustably clamped to the platform through the adjustable clamping nuts 68 and 69, engaging respectively the upper and lower faces of the platform.

Figure 2:
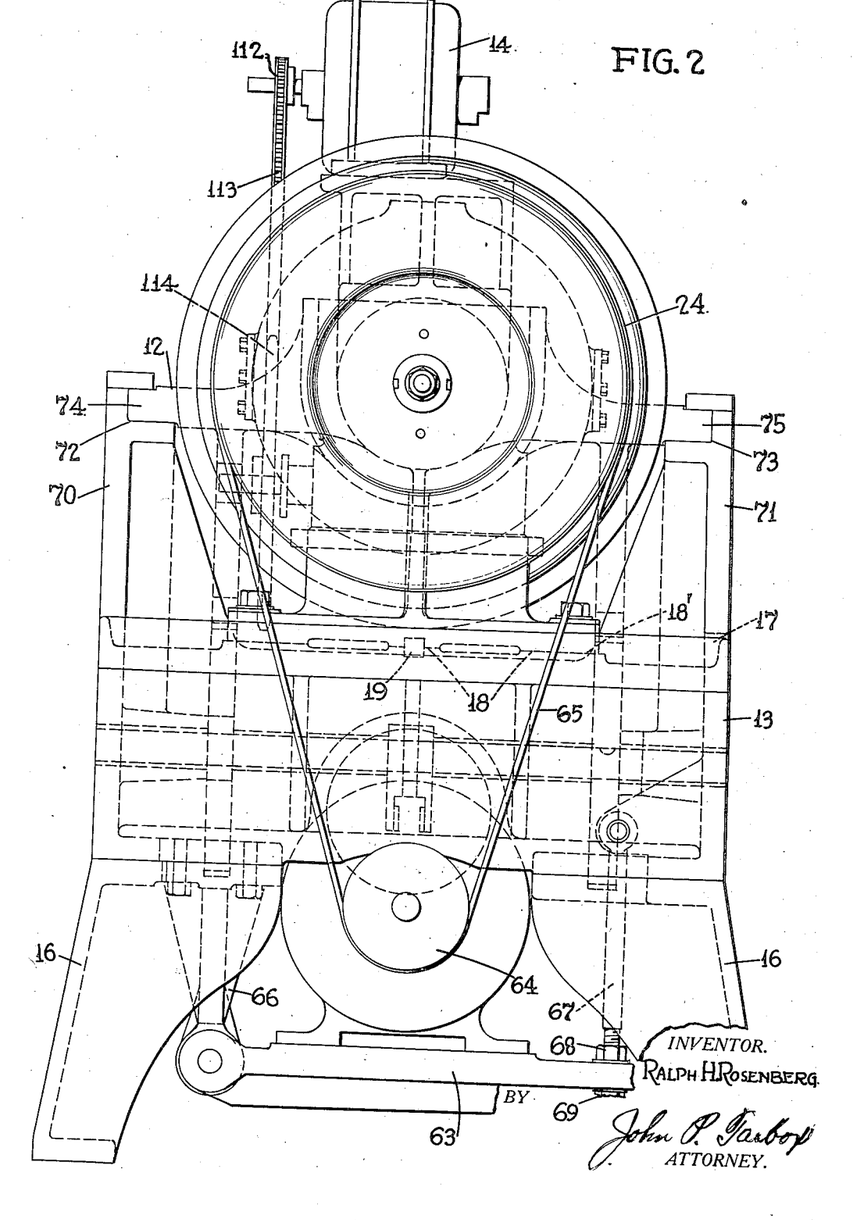

The chuck carrier 12 is mounted to slide between the side walls 70 and 71 at the left hand end of the machine, Fig. 2, the side walls being provided with guiding grooves 72 and 73 with which the lateral extensions 74 and 75 of the carrier are guided and the axis of the chuck is accurately aligned with the axis of the swaging head 10. The carrier may be a hollow casting suitably reinforced by transverse and longitudinal webs and provided in its upper portion with the spaced bearings 76 and 77 of generous proportions adapted to receive the massive chuck holding shaft 78. The bearings are provided with suitable bearing bushings 79 and 80 which may be adjusted and locked in adjusted position by the nuts 81 and 82, respectively. At its inner end the shaft is provided with a flange 81', adapted to be received in a corresponding recess in the chuck 11 and bolted thereto. This permits ready removal of a chuck for holding one kind of work and the substitution of another for holding different work. Thrust bearings 82' are arranged between flange 81' and a shoulder on the inner bearing 77.

The inner face of the chuck is suitably recessed at 83 to receive the work, and further by an annular recess 84 extending radially from the work receiving recess within which are arranged the annular series of jaws 85 forming a substantially continuous support for the outer face of the work. These jaws are mounted to slide longitudinally of the recess 84 on the inclined outer wall 88 of the recess, and when so outwardly slid, see Fig. 5, the work may be placed within the jaws. The inner peripheral face of the jaws will, of course, be shaped to receive the outer peripheral face of the work. As shown, the jaws are adapted to receive the outer periphery and edge flange of a brake drum W, the jaws being recessed at 85' to receive the brake drum edge flange.

Figure 6:
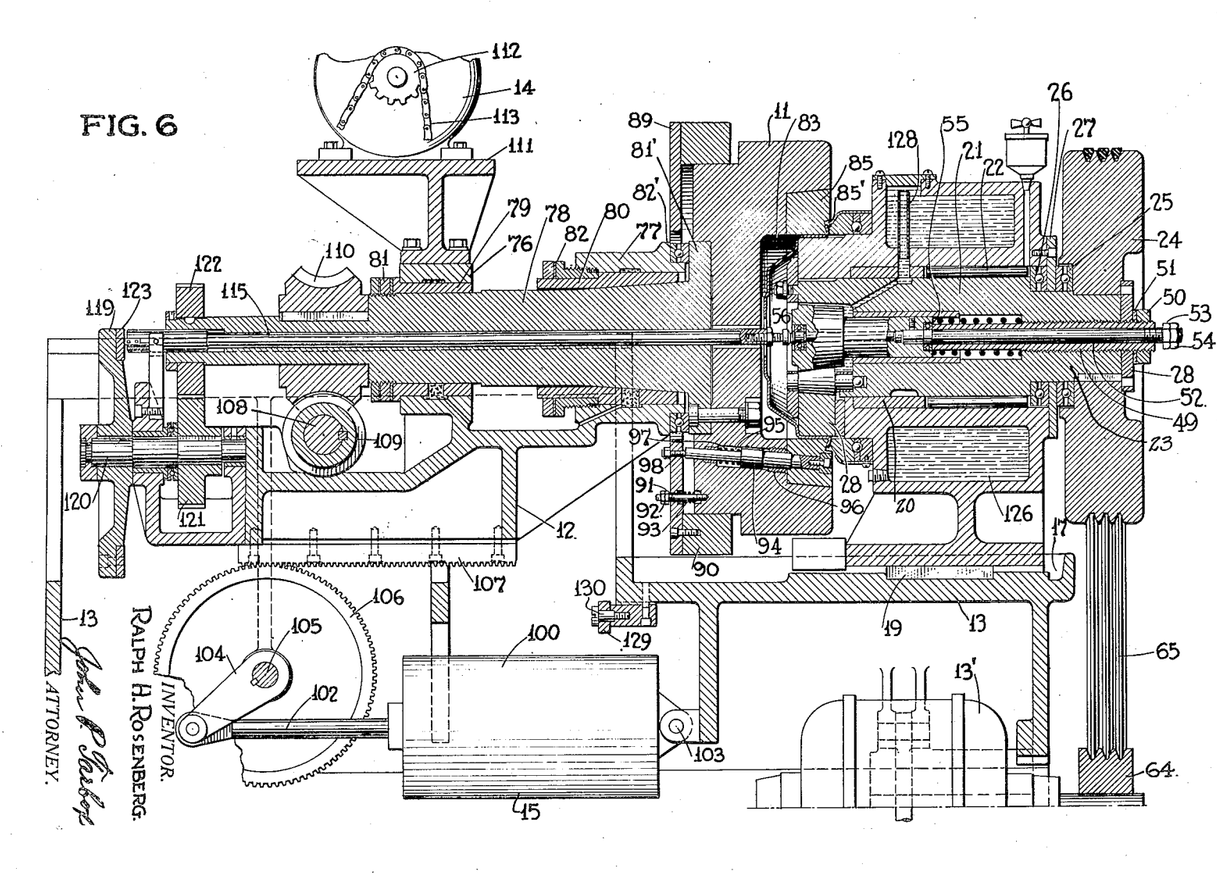
Fig. 6 is a central vertical longitudinal view of the machine showing the swaging head and work clamping chuck in approached position.

The jaws are positively actuated to clamp and release the work by the following means. When the work has been placed in position, as shown in Fig. 5, with the jaws in outward position, the jaws are moved inwardly by the approach of the chuck toward the swaging head. In the final approach movement as shown in Fig. 6, the edge flange of the work engages the rotatable annular ring 58 on the swaging head, which acts not only to position and align the work accurately in the chuck jaws but also forces the jaws inwardly along the inclined wall 88, thereby moving the jaws radially inwardly to firmly clamp the work on its outer periphery. Should the work be of slightly smaller diameter than the diameter between the inner face of the jaws when fully collapsed, the clamping action of the chuck and ring 62 on the edge flange of the work will hold the work in the initial stages of the swaging operation until the work has been expanded against the inner faces of the chuck jaws.

When the chuck is moved away from the clamping head, means are provided for positively moving the jaws outwardly of the chuck to release the work. To this end, an ejector plate 89 is yieldably mounted on the rear face of the chuck, being supported and guided for slidable movement on the body of the chuck by the engagement of a peripheral annulus 90 bolted to the forward face of the plate.

The rearward movement of the plate is limited by an annular series of studs, as 91 screwed into the rear face of the chuck, projecting through aligned holes in the plate, and provided with stop and lock nuts 92. The plate is yieldingly pressed against the stop nuts by coil springs, as 93, surrounding the studs and bearing at their opposite ends against the plate and the rear face of the chuck.

The chuck jaws are each connected to a spring pressed plunger 94 guided for movement in an inclined bore 95 formed in the chuck, and inclined at the same angle as the inclined wall 88 on which the jaws slide. The outward movement of the plunger is limited by an annular plug 96 at the forward end of the bore and it is normally pressed forward against this plug by a coil spring 97 which surrounds the reduced rear end of the plunger and projected through a reduced bore beyond the rear face of the chuck body. An adjustable screw plug 98 is secured to the ejector plate 89 in line with each of the reduced ends of the jaw connected plungers 94.

Figure 3:
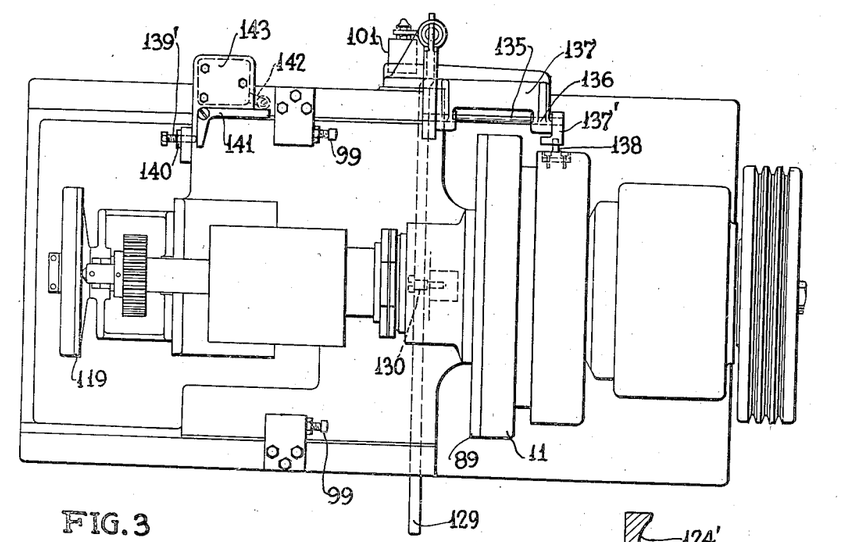

When the chuck is retracted, the springs 97 will tend to force the jaws outwardly to release the work, but should any of the chuck jaws resist the force of the springs, in the last of the separation movement, the ejector plate 89 engages the fixed stops 99, Fig. 3, on the frame of the machine and, in the continued retraction of the chuck, the plungers and jaws are positively moved outwardly to release and eject the work, through the engagement of the plugs 98 on the plate with the projecting ends of the plungers 94.

The approach and separation movement of the chuck and swaging head is conveniently effected from the fluid-actuated motor 15, the opposite ends of the cylinder 100 of which are connected by suitable conduits and ports (not shown) with the control valve 101 to admit or exhaust the motor fluid to or from the opposite sides of a piston (not shown) moveable in the cylinder and connected to the rod 102. One end of the cylinder is pivotally connected at 103 to the frame of the machine and the end of the piston rod is connected to a crank arm 104 splined to a shaft 105. A pair of large spur gears 106 only one of which appears on the drawings, are arranged on opposite sides of the crank arm 104 and secured to the shaft, each of these gears being adapted to mesh with a rack 107 secured to the under side of the chuck carrier 12.

Figs. 5 and 6 will make it clear that less than 180° throw of the crank is required to approach and separate the chuck and swaging head by the means just described. Rotation of the chuck is effected through a transverse shaft 108 mounted in the chuck carrier 13 and a worm 109 of generous proportions splined thereto, the worm, in turn, meshing with a worm wheel 110 splined to the reduced outer end of the shaft 78 adjacent the bearing 76. Shaft 108 is driven from the electric motor 14 mounted on a suitable platform 111 secured to the top of the carrier frame, the drive being through a sprocket pinion 112 on the armature shaft of the motor, chain 113 and sprocket gear 114, Fig. 2. The double speed reduction obtained by the difference in ratio between the gear and pinion and by the worm and worm gear, results in a relatively slow rotation of the chuck, permitting the work in most instances, to be sufficiently treated during one revolution of the chuck.

As part of the means for feeding the hammers radially into the work after the work has been moved over the swaging head by the approach movement of the chuck, I provide an actuator rod 115 movable in an axial bore of the actuator shaft and extending at its inner end into the work receiving recess 83 of the chuck 11 and through a central opening in the work. This end is provided with an adjustable screw plug 116, locked in adjusted position by a lock nut 117 and having a head 118 with a rounded end face adapted to engage the head of the thrust receiving button 57. This adjustment permits of lengthening the actuator rod by very small increments, to enable me to control the internally swaged diameter of the work very accurately.

The position of the actuator rod longitudinally of the shaft is controlled by an annular face cam 119 mounted on a shaft 120 driven in synchronism with the chuck shaft 78 through the spur gears 121, 122, of equal size splined to the respective shafts. The face of the cam may be provided by a hardened insert, and the end of the rod 115, which engages the cam, may be provided likewise with a hardened insert 123.

Figure 11:
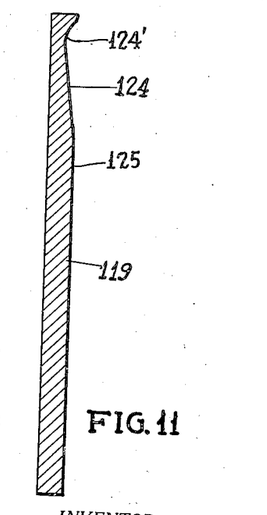
Fig. 11 is a view showing a development of the actuator cam.

When the chuck is in retracted position, a low portion 124' of the cam, as shown by the exaggerated contour of cam, as shown in Fig. 11 is opposite the rod, and the chuck is not rotating. With the work clamped in the chuck and in position over the swaging head, as shown in Fig. 6, the chuck rotating motor 14 is started and the chuck and cam commence rotating in synchronous relation. The gradually inclined portion 124 of the cam at once when the work has attained its normal speed of rotation starts to move the actuator rod forwardly during a portion say, one quarter of a revolution of the cam and work, during which time the swaging hammers are gradually fed toward the work. After the high flat portion 125 of the cam is reached there is no more feeding of the actuator rod, and the hammers are no longer fed in to the work, but the work is perhaps rotated through say, almost three quarters of a revolution through this area of the cam, during which time the swaging gives a fine finish to the surface being swaged and removes any minor inequalities which may have been produced during the heavy swaging while the hammers were being fed into the work by the inclined face of the cam. Just before the work chuck completes its revolution, the high point of the cam is rotated from under the end of the actuator rod, and the chuck is again stopped with the low portion of the cam opposite the end of the rod.

The particular shape of the cam and the relation of its speed of rotation with the speed of rotation of the chuck depends, of course, upon the nature of the work and the finish required in any specific work. Since the working face of the cam consists of a hardened insert, it will be seen that cams of any desired contour can readily be substituted by replacing one insert with another.

The rapidity with which the blows are struck and the consequent working of the metal of the work develops heat at a rapid rate, which, if not rapidly dissipated would mar the work and the machine. To provide for adequate cooling, and at the same time lubricate the moving parts of the swaging head, I form the swaging head with a large reservoir 126 entirely surrounding the bearing for receiving hammer actuator shaft 21, ports and passages 127 leading from this reservoir to the various bearings, and particularly to the space at the inner end of the swaging head carry the hammers and their actuating mechanism. Any suitable cooling and lubricating fluid may be used, and in practice, and during the operation of the swaging head, the cooling fluid is continuously pumped from an outside storage tank, not shown, into the reservoir to keep it filled and renewed and to permit it to constantly overflow through the pipe 128 terminating adjacent the top of the reservoir into the various passages and ports 127. All the various moving parts and particularly the hammers and the surface of the work being operated and against which the liquid, fed to the central bore, is thrown by centrifugal force, are thus continuously supplied with a copious supply of coolant and lubricant, which may be confined by a shield, not shown, placed around the top and sides of the swaging head, to cause that which is thrown off by centrifugal force to return by gravity to the tray 17. From the tray, it may flow back to the storage tank to be used over again. By having the outflow pipe 128 extend almost to the top of the reservoir, in the head, one is always assured of having an adequate supply of fluid directly the pump is started. Also if the pump should fail, the large supply of fluid in the head would prevent any immediate overheating.

The operation of the machine is substantially as follows, the various operations being synchronized and coordinated so that a work piece is completed in one cycle of the machine, when the machine is automatically stopped.

Figure 4:
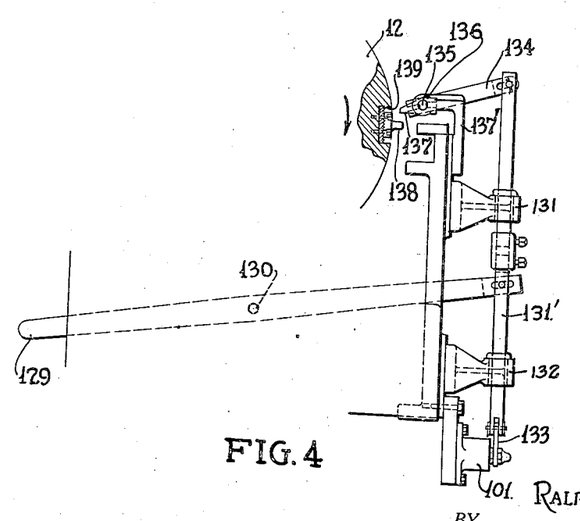
Fig. 4 is a detail view of part of the control mechanism.

The swaging head having been started in operation by throwing a switch to start the motor 13', the work is inserted in the chuck with the swaging head and chuck in separated relation as shown in Fig. 5. The operator then throws the starting lever 129, pivoted at 130 intermediate its ends to operate a vertically slidable rod 131' mounted to slide in the brackets 131 and 132 projecting from the rear of the machine frame. One end of this rod is connected by an arm 133 to the starting valve 101 and the other end of the rod is connected to an arm 134 connected to one end of a rocking shaft 135 journalled in the horizontal arm 136 of an angular section bracket 137 secured to and projecting beyond the end of upstanding side wall 70 (see Fig. 3). The outer end of the rocking shaft is provided with a trip arm 137' adapted to project in the path of trip lug 138 projecting beyond the periphery of the cylindrical body of the chuck 12, but having its base removably secured in a recess 139 in the chuck. (See Figs. 3 and 4.) The throwing of the starting lever swings trip arm 137' into the path of the lug 138, but the lug, rotating with the chuck in clock-wise direction (see arrow in Fig. 4) does not strike the trip lever until it has made approximately a complete revolution.

When the lever is thrown, the rod 131 is depressed to open the valve 101 to admit fluid under pressure to the right hand end of the cylinder 100 and to connect the exhaust to the left hand end, thus driving the piston outwardly and rotating the shaft 105 and spur gears 106 in clockwise direction to cause the chuck to approach the swaging head and bring the work in operative relation therewith as described hereinbefore and as shown in Figs. 3 and 6.

In the final approaching movement, (see Fig. 3) an adjustable actuator pin 139', locked by a nut 140 and movable with the carrier 12 strikes an inwardly projecting arm of the bell crank lever 141 pivoted on the top of the side wall 17 of the machine base, and throws the other arm of said lever against the spring pressed switch arm 142 of the motor starting switch 143 to close the circuit of the motor 14, and start the rotating of the chuck and the radial feeding of the hammers into the work as hereinbefore described. When the chuck has completed a revolution the trip lug 138 strikes the trip arm 137 to restore the starting lever and connected parts to initial position. In this movement the valve 101 is actuated to admit fluid under pressure to the left hand end of the motor cylinder 100 and to connect the right hand end to the exhaust, so that the chuck carrier is receded from the swaging head. In this receding movement, the work holding jaws 85, if not too tightly pressed to the inclined faces 88 of the chuck are moved outwardly by the springs 97 to release the work which is then free to drop out. If the jaws resist the tension of springs 97, they are positively moved to open position in the last of the separation movement by the engagement of the ejector plate 89 with the stops 99, to permit the work to drop out of the chuck. The machine is now ready to receive a new work piece and to repeat the cycle of operations.

Figure 9:
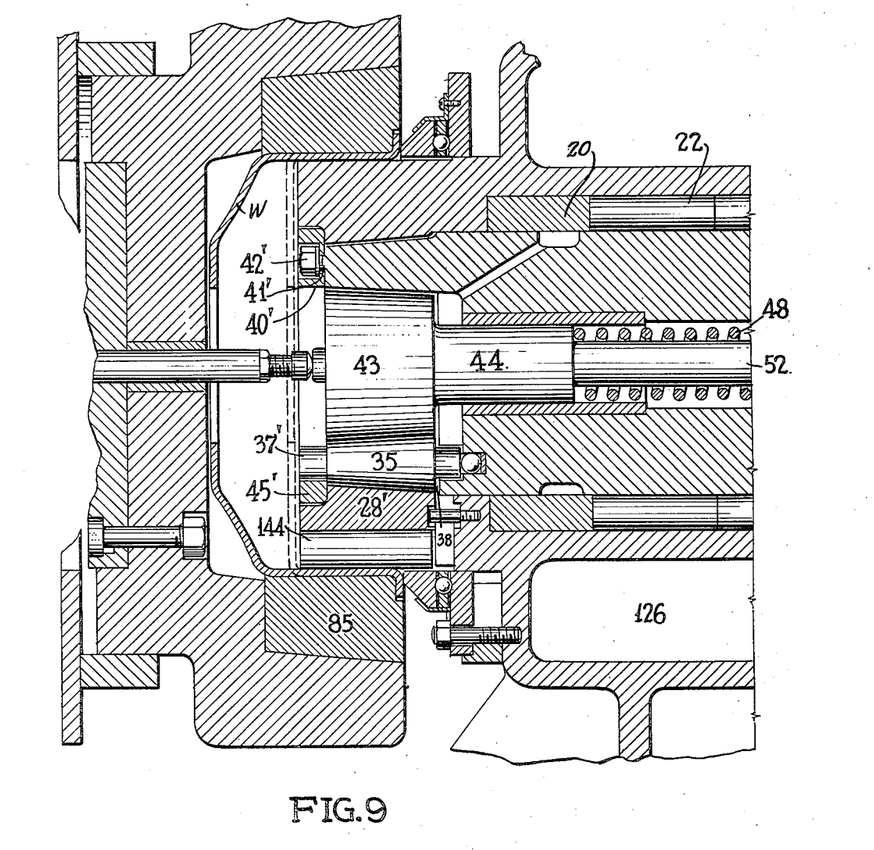
Fig. 9 is a detail longitudinal vertical section through a slightly modified form of swaging head and work clamping chuck.

In the modification shown in Fig. 9, the swaging head has a relatively flat front face since the bearing plate 40' for the inner roller trunnions 37' is in this case set in a recess formed in the outer face of the head, and the securing studs and nuts 41' and 42' are set into recesses in the plate. This arrangement is desirable for certain classes of work having a radially extending portion immediately adjacent the surface to be swaged, as indicated in dotted lines, Fig. 9.

Figure 10:
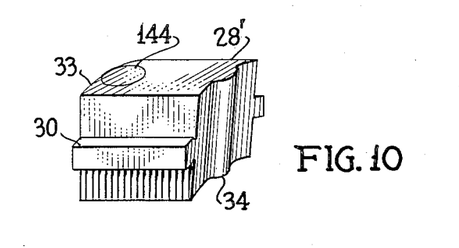
Fig. 10 is a detail perspective view of one of the swaging hammers.

In Fig. 10, I have shown a modified hammer block 28' provided with a hardened cylindrical insert 144 inserted in a corresponding recess in the central portion of the working face of the hammer, this insert projecting slightly beyond the normal face of the hammer and engaging the work. By the use of such an insert, the working face of the hammer can be readily renewed without the necessity of substituting an entire hammer block, and a harder material may be used in this insert than that forming the body of the block.

The machine, which is the subject of the present invention, produces a braking surface that is truly cylindrical, and is smoothed by blows which actually swage or compress the braking surface side of the blank. By the term "swaging", employed throughout the specification and claims, is meant the "striking" of the surface of a work-piece by hammer blows.

What I claim is:

1. In a machine of the class described, work clamping means for engaging an outer peripheral surface of a work piece, hammering means and rotating actuating means therefor for swaging an internal face of the work, and means for rotating the clamping means and hammer actuating means to swage the work piece over its entire internal peripheral face.

2. In a machine of the class described, work clamping means for engaging a peripheral face of the work, hammering means and actuating means therefor for reducing another peripheral surface of the work to accurate dimension, and means for rotating the clamping means and hammer actuating means during the swaging operation.

3. In a machine of the class described, work clamping means for engaging an outer peripheral surface of an annular work piece, hammering means and actuating means therefor for swaging an inner peripheral surface in the work, and means for rotating said clamping means and hammer actuating means while swaging to reduce said inner peripheral surface to a true surface of revolution.

4. In a machine of the class described, a swaging head adapted to receive a work piece in operative relation thereto, said swaging head carrying a plurality of substantially radially movable hammers, rollers abutting said hammers to force them outwardly to operate upon an internal face of the work and means for rotating said hammers.

5. In a machine of the class described, a swaging head adapted to receive an annular work piece in operative relation thereto, said swaging head carrying a pair of radially movable hammers, and means for successively actuating said hammers including a rapidly rotating actuator.

6. In a machine of the class described, a swaging head adapted to receive a work piece in operative relation thereto, said swaging head carrying a plurality of substantially radially movable hammers, and a rapidly rotating actuator for engaging said hammers to actuate them to operate upon the work, said actuator being variable in diameter to vary its action upon the hammers.

7. In a machine of the class described, a swaging head adapted to receive an annular work piece in operative relation thereto, said swaging head carrying a hammer or hammers movable substantially radially to operate upon an inner peripheral surface of the work, and a rapidly rotating actuator adapted to engage said hammer or hammers to throw them outwardly against the work, said actuator being expansible to throw the hammers outwardly increasingly in the swaging operation.

8. In a machine of the class described, a swaging head, a work piece clamping head arranged to be brought into operative relation with said swaging head and means for rotating said clamping head, said swaging head carrying a plurality of hammers mounted for substantially radial movement, an actuator for said hammers, and means for relatively rotating the hammers and actuator to cause the hammers to successively operate on different portions of the work.

9. In a machine of the class described, a swaging head adapted to receive a work piece in operative relation thereto, said swaging head carrying a plurality of hammers mounted for substantially radial movement therein, and means for actuating said hammers comprising rollers for directly engaging the inner ends of said hammers, and a member for radially supporting said rollers, means for relatively rotating said hammers and rollers for actuating the hammers to cause them to operate outwardly upon the work.

10. In a machine of the class described, a swaging head comprising an outer stationary part to receive a work piece thereover, hammers mounted for radial movement in said stationary part, an actuator shaft mounted for rotation in said stationary part, rollers carried by said actuator shaft and mounted for substantially radial movement therein, and a support in said actuator shaft for supporting said rollers on their sides opposed to the hammers, the rollers being adapted in the rotation of the shaft to engage the hammers to cause them to operate upon the work.

11. In a machine of the class described, a swaging head adapted to receive a work piece in operative relation thereto, a plurality of hammers mounted for substantially radial movement thereon, conical rollers for engaging said hammers, a conical support for engaging the rollers, and axially movable to move the rollers outwardly, and means for relatively rotating said hammers and rollers for actuating the hammers to operate upon the work.

12. In a machine of the class described, a swaging head carrying a pair of substantially diametrically disposed radially movable hammers, expansible and contractible actuating means for said hammers, means for relatively rotating said hammers and actuating means, and means for automatically expanding and contracting said actuating means.

13. In a machine of the class described, a swaging head adapted to receive a work piece in operative relation thereto, a plurality of hammers mounted for substantially radial movement therein, an actuator shaft mounted for rotation in said head, and expansible and contractible means associated with said shaft for cooperation with said hammers to actuate the same to operate upon the work.

14. In a machine of the class described, a swaging head, a work holding means, means for relatively approaching and separating said head and work holding means, hammers mounted for substantially radial movement on said head, expansible actuating means for said hammers, means for relatively rotating the hammers and actuating means to cause the hammers to operate on the work, means for relatively rotating the work holding means and hammers, and means for expanding the actuating means during said last-named relative rotation.

15. In a machine of the class described, a work holding means for engaging a peripheral face of a work piece, a swaging means for operating upon another peripheral face thereof, means for relatively rotating the swaging means and work holding means, and means for feeding the swaging means into the work in such relative rotation, and means for automatically retracting said feeding means upon completion of the swaging operation.

16. In a machine of the class described, a work holding means for engaging a peripheral face of a work piece, a swaging means for operating upon another peripheral face of the work over substantially the entire surface thereof, means for rotating said swaging means and work holding means and for positively feeding the swaging means into the work in such relative rotation.

17. In a machine of the class described, a work clamping means and a swaging means for applying hammer blows to the work arranged in axially aligned relation, means for relatively axially approaching the work holding means and swaging means to bring the work into operative relation with the swaging means, and means for automatically clamping the work in said approach movement.

18. In a machine of the class described, a work clamping means, a swaging means for applying hammer blows to the work, means for relatively axially approaching and separating said clamping and swaging means, means for positively clamping the work in the approach movement, and means for releasing the work on the separation movement.

19. In a machine of the class described, a work clamping means, a swaging means for applying hammer blows to the work, means for relatively axially approaching and separating said clamping and swaging means, and means for positively releasing the work on the separation movement.

20. In a machine of the class described, a work clamping means, a swaging head, means for relatively approaching and separating said work clamping means and head, means for relatively rotating said head, and means for automatically initiating said rotating movement in the approach movement.

21. In a machine of the class described, a work clamping means, a swaging head, means for relatively approaching and separating said work clamping means and head, means for relatively rotating said work clamping means and head, means for automatically initiating said rotating movement in said approach movement, and means for automatically initiating the separation movement after a pre-determined rotative movement.

22. In a machine of the class described, a work clamping means and a swaging head having relative movement of approach and separation, means for relatively rotating said head and clamping means, and means for automatically initiating a separation movement between said clamping means and head after a predetermined rotative movement.

23. In a machine of the class described, a work clamping means, and a swaging head having relative movement of approach and, means for relatively rotating said head and clamping means, means for initiating said rotative movement in the last of the approach movement, means for initiating the separation movement after a pre-determined rotative movement, and means for stopping the rotative movement in the separation movement.

24. In a machine of the class described, a work clamping means, and a swaging head having relative movements of approach and separation and rotation, means for effecting said movements, manual means for initiating the approach movement, automatic means for initiating the rotative movement in the last of the approach movement, automatic means for initiating the separation movement after a pre-determined rotative movement and for stopping the rotative movement in the separation movement.

25. In a machine of the class described, work clamping means having a plurality of work holding jaws mounted for axial and radial movement to release and clamp the work, said work clamping means being mounted for approach and separation movement with respect to a swaging head for operating on the work, means for causing inward movement of the jaws to clamp the work on the approach movement, and means for causing outward movement of the jaws to release the work on the separation movement.

26. In a machine of the class described, a swaging head having radially movable hammers for operating upon an inner peripheral surface of a work piece, an actuator rotating at high speed for causing the hammers to deliver hammer blows in rapid succession upon the work, and means for imparting a relatively slow rotation to the work while operated on by the hammers.

27. In a machine of the class described, a swaging means and a work clamping means arranged in axially aligned relation, means for relatively approaching and rotating said swaging means and work clamping means, and means arranged axially on said head and work clamping means for feeding the swaging means into the work in said relative rotation.

28. In a machine of the class described, a swaging means, a work clamping means, means for relatively approaching and rotating said swaging means and work holding means, and a rod arranged axially of the work clamping means and adapted to cooperate with a frusto-conical actuator on the swaging means, to feed the swaging means outwardly, and a cam driven in synchronism with said rotating means for operating said rod.

29. In a machine of the class described, means for chucking and rotating a friction member, and impact means for swaging a friction surface of said member while so chucked and rotated, said chucking means affording an anvil surface for said impact means.

30. In a machine of the class described, means for engaging a friction member about the periphery thereof, and means for swaging by a hammer striking action said member against said engaging means, whereby to compact the metal of said friction member.

31. In a machine of the class described, means for engaging a friction member about the outer periphery thereof, and radially outwardly acting means for swaging, by a hammer striking action, said member against said engaging means, whereby to compact the metal of said friction member.

32. A swaging head adapted to receive an annular work piece in operative relation thereto, said swaging head carrying a plurality of radially movable hammers, and means for successively actuating said hammers outwardly.

33. A machine for cold-working a brake drum consisting of a head and a flange, which comprises means for chucking said drum, and radially movable impact means for swaging a surface of said flange while the drum is so chucked, the chucking means affording an anvil surface for the impact means.

RALPH H. ROSENBERG.